US011965570B2

United States Patent
Gherardi et al.

(10) Patent No.: US 11,965,570 B2
(45) Date of Patent: Apr. 23, 2024

(54) ACTUATOR DEVICE OF A BRAKING DEVICE AND A CLUTCH

(71) Applicant: BREMBO S.p.A., Curno (IT)

(72) Inventors: Pierangelo Gherardi, Curno (IT); Roberto Arienti, Curno (IT); Andrea Odoni, Curno (IT); Carlo Cantoni, Curno (IT)

(73) Assignee: Brembo S.p.A., Curno (IT)

( * ) Notice: Subject to any disclaimer, the term of this patent is extended or adjusted under 35 U.S.C. 154(b) by 242 days.

(21) Appl. No.: 17/602,070

(22) PCT Filed: Apr. 3, 2020

(86) PCT No.: PCT/IB2020/053185
§ 371 (c)(1),
(2) Date: Oct. 7, 2021

(87) PCT Pub. No.: WO2020/208488
PCT Pub. Date: Oct. 15, 2020

(65) Prior Publication Data
US 2022/0196095 A1  Jun. 23, 2022

(30) Foreign Application Priority Data
Apr. 12, 2019  (IT) .......................... 102019000005662

(51) Int. Cl.
*F16D 67/04* (2006.01)
*B60T 13/16* (2006.01)
(Continued)

(52) U.S. Cl.
CPC .............. *F16D 67/04* (2013.01); *B60T 13/16* (2013.01); *B60T 13/686* (2013.01); *F16D 2125/023* (2013.01); *F16D 2300/18* (2013.01)

(58) Field of Classification Search
CPC .... F16D 67/04; F16D 2125/023; B60T 13/16; B60T 13/686; B60T 11/103;
(Continued)

(56) References Cited

U.S. PATENT DOCUMENTS 3,780,762 A * 12/1973 Matthews ............... F16D 67/04
192/221
2005/0116537 A1  6/2005 Zalewski et al.
(Continued)

FOREIGN PATENT DOCUMENTS

| CN | 1982149 A | 6/2007 |
|---|---|---|
| CN | 103596833 A | 2/2014 |

(Continued)

OTHER PUBLICATIONS

European Patent Office, International Search Report and Written Opinion in Application No. PCT/IB2020/053185, dated Jun. 16, 2020, 10 pages, Rijswijk, Netherlands.
(Continued)

*Primary Examiner* — Richard W Ridley
*Assistant Examiner* — Aimee Tran Nguyen
(74) *Attorney, Agent, or Firm* — Marshall & Melhorn, LLC

(57) ABSTRACT

An actuator device of a braking device and a clutch may have a pump provided with a single operating device for pressurizing a fluid by a float, and a first delivery circuit and a second delivery circuit fluidly connected to an outlet of the pump. The first delivery circuit may be fluidly connectable
(Continued)

to a braking device, the second delivery circuit may be fluidly connectable to a clutch. The actuator device may have a diverter device suitable for fluidly connecting the output of the pump alternately with the first delivery circuit and with the second delivery circuit, so as to alternately actuate the braking device or the clutch.

19 Claims, 3 Drawing Sheets

(51) Int. Cl.
*B60T 13/68* (2006.01)
*F16D 125/02* (2012.01)

(58) Field of Classification Search
CPC ...... B60T 11/165; B60T 11/24; B60T 13/167; B62L 3/023; F15B 7/06
See application file for complete search history.

(56) References Cited

U.S. PATENT DOCUMENTS

| | | | |
|---|---|---|---|
| 2005/0258011 A1* | 11/2005 | Hutchison | B62L 3/023 192/13 R |
| 2017/0259877 A1* | 9/2017 | Thompson | B60T 11/16 |
| 2019/0009761 A1* | 1/2019 | Arienti | B60T 8/38 |
| 2020/0114894 A1 | 4/2020 | Leiber | |

FOREIGN PATENT DOCUMENTS

| | | |
|---|---|---|
| CN | 104412009 A | 3/2015 |
| CN | 106458185 A | 2/2017 |
| CN | 109196243 A | 1/2019 |
| CN | 109312852 A | 2/2019 |
| EP | 0097210 A1 | 1/1984 |
| GB | 2555881 A | 5/2018 |
| JP | S5938161 A | 3/1984 |
| WO | 2011113091 A1 | 9/2011 |
| WO | 2017115245 A1 | 6/2017 |

OTHER PUBLICATIONS

China National Intellectual Property Administration, Office Action in Application No. CN202080028253.3, dated Aug. 18, 2023, 15 pages.
European Patent Office, Office Action for Application No. EP 20716589.5, dated Jun. 20, 2023, 5 pages.
Taiwan Intellectual Property Office, Examination Report in Application No. TW109111908, dated Nov. 2, 2023, 9 pages.

* cited by examiner

ACTUATOR DEVICE OF A BRAKING DEVICE AND A CLUTCH

FIELD OF APPLICATION

The present invention relates to an actuator device for a braking device and a clutch, in particular for motorcycles, and a relative actuator system comprising said actuator device.

BACKGROUND

The present invention finds particular application in the field of racing motorcycles.

The solutions in use today require the rear brake to be operated by a pump mounted on the half-handlebar (usually the left) and operated by the thumb or via a standard pump operated connected to a pedal placed on the pedalboard (usually the right) and operated by the pilot's foot.

On the half-handlebar there is also the lever for operating the clutch which is used only at the start, because during the race the gear change takes place without the need to operate the clutch lever.

In addition to starting, the clutch operating lever may also be used in case of failure or emergency.

Such known solutions have drawbacks and limitations.

According to a known embodiment, there are two controls on the left half-handlebar that the pilot can operate with his hand (for the clutch) and with his thumb (for the brake).

However, the use of the thumb is not optimal since it does not allow a high and precise modulation of the hydraulic control, certainly not higher than that obtainable with a pedal control. On the other hand, if two controls were used on the half-handlebar, respectively designed to operate the brake and the clutch by means of the 4 fingers, this layout would be dangerous in the event of a fall, because the pilot's hand could easily get caught between the levers and the related actuators.

For these reasons, the known solutions provide for the use of a pedal brake control and a clutch control on the half-handlebar, or the use of two lever controls on the same half-handlebar, one of which (typically the brake control) in order to be operated by the thumb. The latter solution, however, as seen, limits the pilot's ability to effectively modulate the brake connected to it.

SUMMARY

The need to solve the drawbacks and limitations mentioned with reference to the prior art is therefore increasingly felt.

Such a need is met by an actuator device according to the claims.

In particular, such a need is met by an actuator device of a braking device and a clutch comprising
- a pump provided with a manually operated device for pressurizing a fluid by means of a float,
- a first delivery circuit and a second delivery circuit fluidly connected to an outlet of said pump,
- the first delivery circuit being fluidly connected to a braking device,
- the second delivery circuit being fluidly connected to a clutch, wherein
the actuator device comprises diverter means suitable for fluidly connecting the output of the pump alternately with the first delivery circuit and with the second delivery circuit, so as to alternately actuate the braking device or the clutch.

According to a possible embodiment, said diverter means are operatively connected with a switch able to arrange the diverter means to set the fluid connection of the outlet of the pump with the first delivery circuit or with the second delivery circuit respectively.

According to a possible embodiment, said actuator device comprises a processing and control unit programmed to control the diverter means according to the signal received by said switch.

According to a possible embodiment, said actuation sensor is arranged in the vicinity of the manual actuation device.

According to a possible embodiment, said actuation sensor is arranged in the vicinity of said diverter means.

According to a possible embodiment, said processing and control unit is operatively connected to a pressure sensor arranged on the outlet of the pump.

According to a possible embodiment, said processing and control unit is operatively connected to at least one pressure sensor arranged on each of said first and second delivery circuits.

According to a possible embodiment, the diverter means comprise a first shut-off valve and a second shut-off valve, and wherein the outlet of the pump forks into a first branch and a second branch,
wherein the first branch is connected/disconnected to/from the first delivery circuit by the first shut-off valve,
and wherein the second branch is connected/disconnected to/from the second delivery circuit by the second shut-off valve.

According to a possible embodiment, said shut-off valves are two-way solenoid valves, switched so that when the first shut-off valve is open, the second shut-off valve is closed and vice versa.

According to a possible embodiment, the diverter means comprise a 3-way shut-off valve, arranged on the outlet of the pump and alternately connectable to the first delivery circuit and the second delivery circuit.

According to a possible embodiment, said three-way shut-off valve is provided with pneumatic actuation.

According to a possible embodiment, said three-way shut-off valve is provided with electric or electromagnetic or manual actuation.

According to a possible embodiment, the actuator device comprises a further manual operating device, separate from said manual operating device, which intercepts the second delivery circuit downstream of the diverter means, so as to be able to directly actuate the clutch.

According to a possible embodiment, the actuator device comprises a further manual operating device, separate from said manual operating device, which intercepts the first delivery circuit downstream of the diverter means, so as to be able to directly operate the braking device.

The present invention also relates to a hydraulic actuator system for a motorcycle comprising an actuator device of a brake and a clutch, wherein the system comprises a braking device fluidly connected to the first delivery circuit and a clutch fluidly connected to the second delivery circuit.

The present invention also relates to a motorcycle comprising an actuator device of a brake and a clutch.

DESCRIPTION OF THE DRAWINGS

Further features and advantages of the present invention will appear more clearly from the following description of preferred non-limiting embodiments thereof, in which.

Elements or parts of elements in common to the embodiments described below are referred to with the same reference numerals.

DETAILED DESCRIPTION

Figure 1:
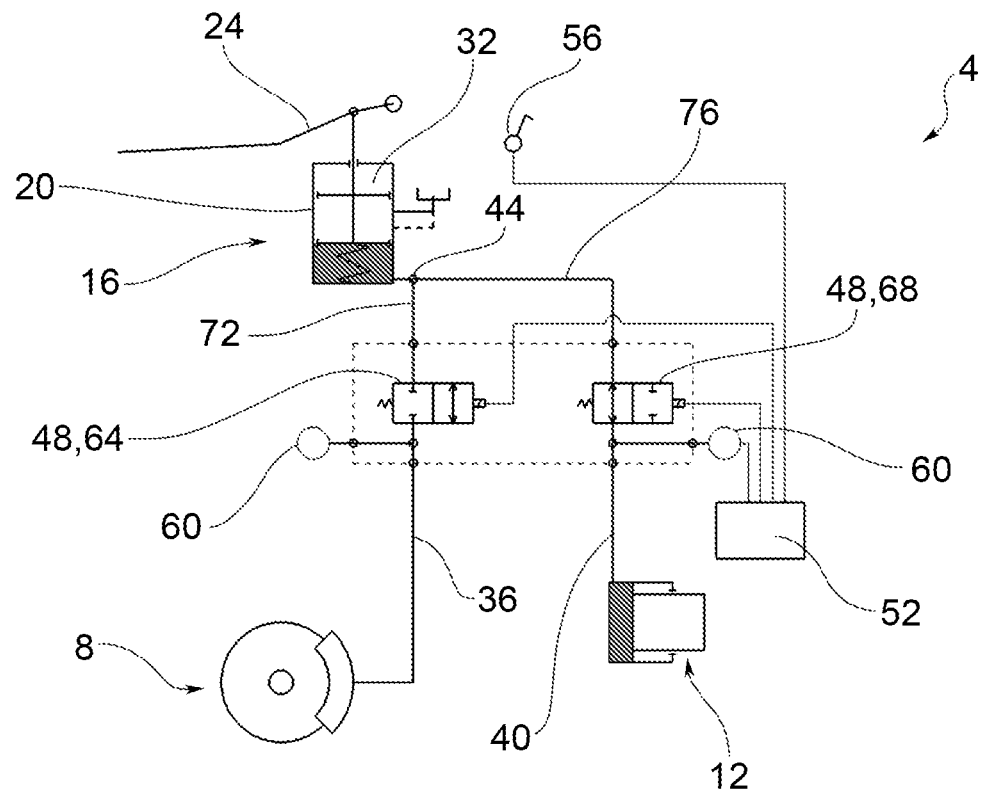
FIG. 1 shows a schematic view of a first embodiment of the present invention, in a condition of actuation of a clutch.

With reference to the aforesaid figures, reference numeral 4 generally indicates a hydraulic actuator system for motorcycles, in particular for the hydraulic actuation of at least one brake 8 and at least one clutch 12 of a motorcycle.

In particular, said hydraulic actuator system 4 comprises an actuator device 16 for the brake 8 and for the clutch 12.

Said actuator device 16 comprises a pump 20 provided with a manual operating device 24 for pressurizing a fluid by means of a float 32, in a known manner.

The manual operating device 24 is for example a lever device suitable for being gripped by a user on the handlebar of a motorcycle; it is also possible that the manual operating device 24 is a pedal device.

The actuator device is in turn provided with handlebar fixing means (not shown).

The actuator device 16 is further provided with a first and a second delivery circuit 36, 40 fluidly connected to an outlet 44 of said pump 20.

In other words, the first and the second delivery circuits 36, 40 may be crossed by the fluid put under pressure by the float 32 and coming from the outlet 44.

The first delivery circuit 36 is fluidly connectable to the braking device or brake 8; the second delivery circuit 40 is fluidly connectable to the clutch 12.

It should be noted that, for the purposes of the present invention, the type of braking device 8, which for example may be a disc brake, or a drum brake, and the type of clutch 12, are not important.

Advantageously, the actuator device 16 comprises diverter means 48 suitable for fluidly connecting the output 44 of the pump 20 alternately with the first delivery circuit 36 and with the second delivery circuit 40, so as to alternately actuate the braking device 8 or the clutch 12.

In other words, the diverter means 48 alternately connect the outlet with each of said delivery circuits 36, 40 according to the type of actuation requested by the user.

In particular, according to an embodiment, said diverter means 48 are operatively connected with a switch 56 able to arrange the diverter means to set the fluid connection of the outlet 44 of the pump 20 with the first delivery circuit 36 or with the second delivery circuit 40, respectively.

In other words, based on the position of the switch 56, the diverter means 48 carry out the fluid connection of the outlet 44 of the pump 20 alternately with the first delivery circuit 36 or with the second delivery circuit 40, so as to allow, respectively, the actuation of the braking device 8 or of the clutch 12, by means of the same manual operating device 24.

According to an embodiment, the actuator device 16 comprises a processing and control unit 52 programmed to control the diverter means 48 according to the signal received by said switch 56.

Said switch 56 may be arranged in the vicinity of the first and second manual actuator device 24, 28 or it may also be placed in the vicinity of the diverter means 48.

According to an embodiment, the processing and control unit 52 is operatively connected to a pressure sensor 60 arranged on the outlet 44 of the pump 20.

The processing and control unit 52 may also be operatively connected to at least one pressure sensor 60 arranged on each of said first and second delivery circuits 36, 40.

According to a further embodiment, the processing and control unit 52 can control the diverter means 48 according to further control logics, also of the automatic type, that is, not linked to the actuation of a switch 56 by the pilot.

For example, since the clutch 12 must be usually activated for starting the motorcycle, it is possible to provide that the processing and control unit operates the diverter means 48 in the position of fluid connection with the second delivery circuit 40 and therefore with the clutch 12, when the forward speed of the motorcycle is lower than a threshold value, close to or if anything equal to zero (i.e. stationary vehicle). It is also possible to provide further operating logics of the actuator means 48 by the processing and control unit 52.

The diverter means 48 which alternately connect the first and the second delivery circuit 36, 40 with the outlet 44 may be of various types.

According to a possible embodiment (FIGS. 1, 2, 5, 6), the diverter means 48 comprise a first and a second shut-off valve 64, 68, and the outlet 44 of the float 32 forks into a first branch 72 and a second branch 76.

In particular, the first branch 72 is connected/disconnected to/from the first delivery circuit 36 by the first shut-off valve 64; the second branch 76 is connected/disconnected to/from the second delivery circuit 40 by the second shut-off valve 68.

Said shut-off valves 64 are, for example, two-way solenoid valves, switched so that when one valve is open the other is closed and vice versa.

Figure 5:
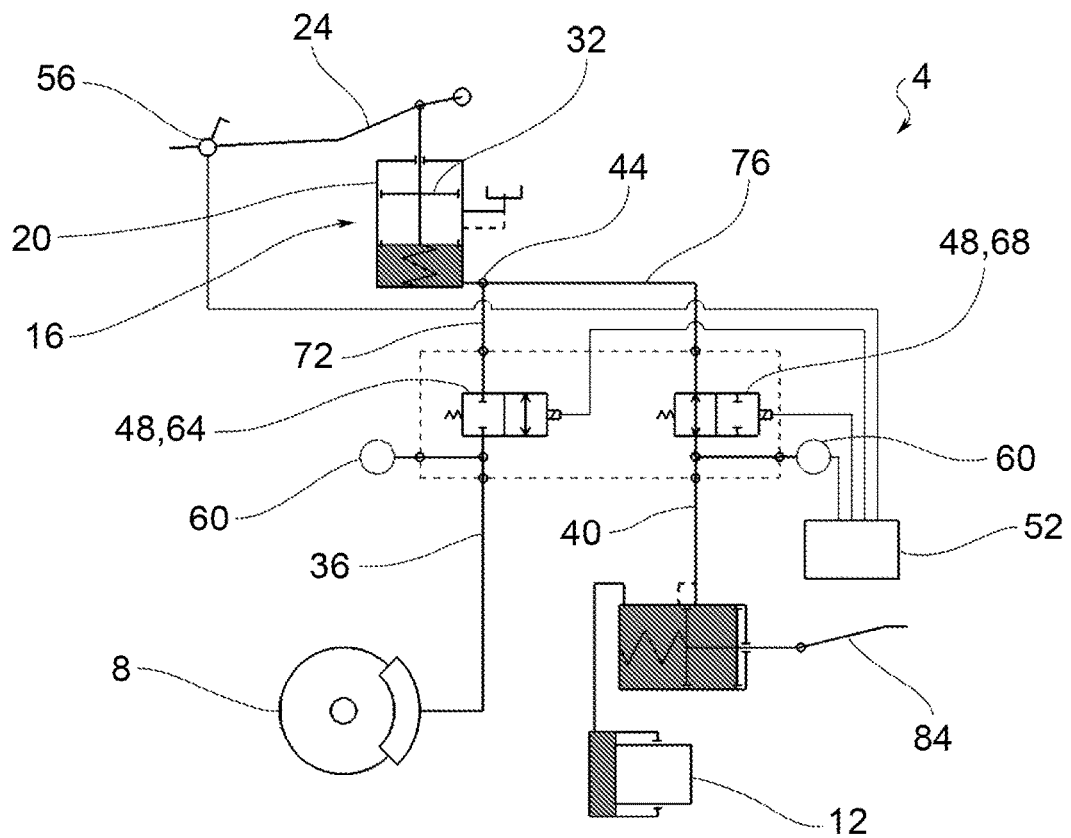
FIG. 5 show shows an alternative solution, applicable to the first two, in which, in the clutch system, a second actuator is inserted which is used to operate the clutch in case of emergency without operating the first actuator.

For example, in FIGS. 1 and 5, the first shut-off valve 64 is actuated in such a way as to disconnect the first branch 72 from the first delivery circuit 36 and, at the same time, the second shut-off valve 68 is actuated so as to fluidly connect the second branch 76 with the second delivery circuit 40: in this way, the outlet 44 is fluidly connected only with the second delivery circuit 40 and can therefore actuate the relative clutch 12.

Figure 2:
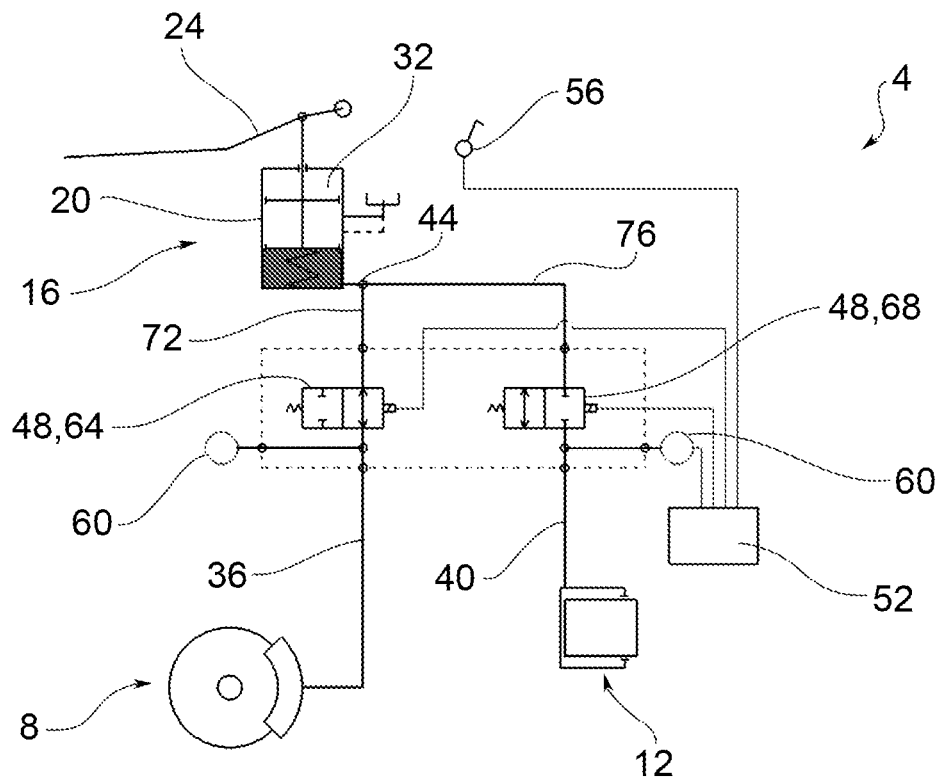
FIG. 2 shows a schematic view of a first embodiment of the present invention, in a condition of actuation of a brake.
Figure 6:
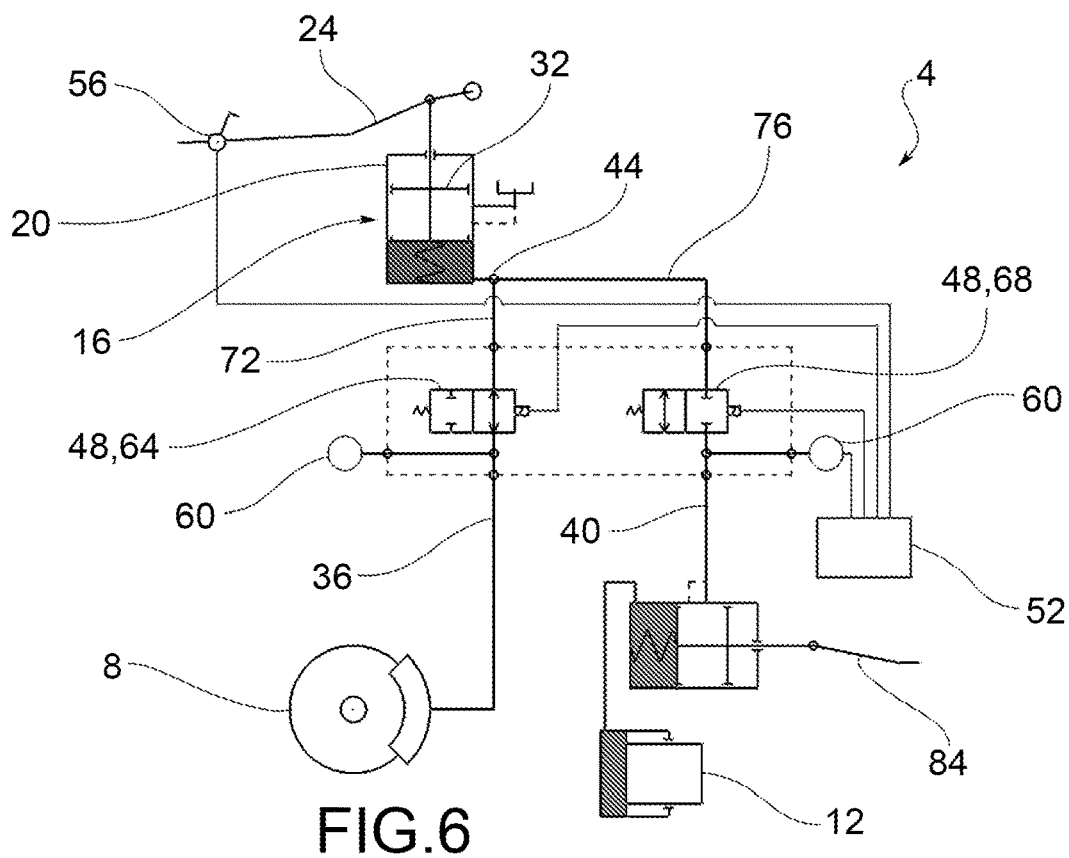
FIG. 6 shows an alternative solution, applicable to the first two, in which, in the clutch system, a second actuator is inserted which is used to operate the clutch in case of emergency without operating the first actuator.

On the other hand, in FIGS. 2 and 6, the first shut-off valve 64 is actuated so as to connect the first branch 72 with the first delivery circuit 36 and, at the same time, the second shut-off valve 68 is actuated so as to fluidly disconnect from each other the second branch 76 from the second delivery circuit 40: in this way, the outlet 44 is fluidly connected only with the first delivery circuit 36 and can therefore actuate the relative braking device 8.

According to a possible embodiment (FIGS. 3, 4), the diverter means 48 comprise a 3-way shut-off valve 80, arranged on the outlet 44 of the pump 20 and alternately connectable to the first and the second delivery circuit 36, 40.

For example, said three-way shut-off valve 80 is provided with pneumatic actuation.

It is also possible to provide that the three-way shut-off valve 80 is provided with electric or electromagnetic or manual actuation.

Figure 3:
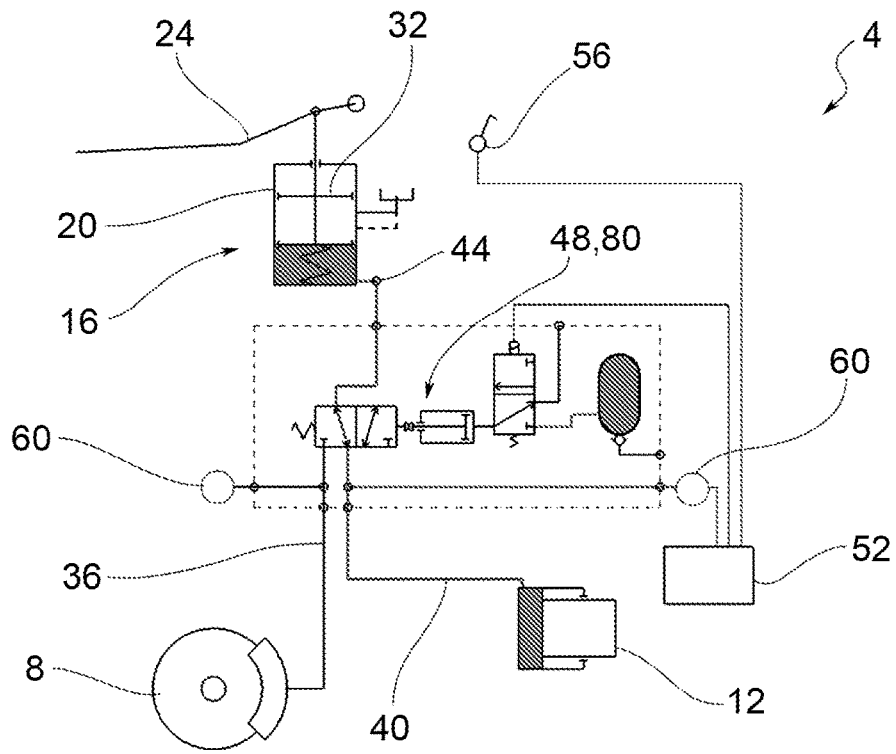
FIG. 3 show shows a schematic view of a second embodiment of the present invention, in a condition of actuation of a clutch.

FIG. 3 shows the condition in which the 3-way shut-off valve 80 is operated in such a way as to put the outlet 44 in fluid communication with the second delivery circuit 40 and disconnect the same outlet 44 from the first delivery circuit 36: in this way, the fluid put under pressure by the float 32 is able to operate only the clutch 12.

Figure 4:
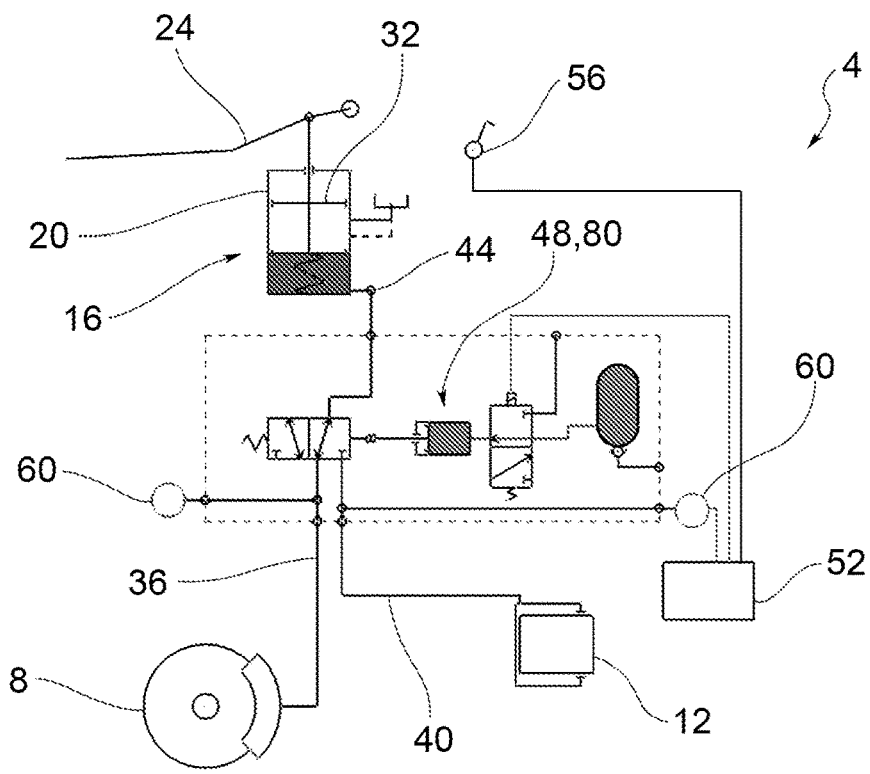
FIG. 4 shows a schematic view of a second embodiment of the present invention, in a condition of actuation of a brake.

On the other hand, FIG. 4 shows the condition in which the 3-way shut-off valve 80 is operated so as to put the outlet 44 in fluid communication with the first delivery circuit 36 and disconnect the same outlet 44 from the second delivery circuit 40: in this way, the fluid put under pressure by the float 32 is able to operate only the braking device 8.

According to a possible embodiment, the actuator device 16 comprises a further manual operating device 84, separate from the manual operating device 24, which intercepts the second delivery circuit 40 downstream of the diverter means 48, so as to be able to directly actuate the clutch 12.

The manual operating device 84 is typically used to manage an emergency situation, due for example to the motorcycle going out of track and/or an engine failure: in these conditions it is important to allow the pilot to operate the clutch or disconnect the engine transmission in order to avoid, for example, dangerous locking of the transmission and therefore of the rear wheel.

The manual operating device 84 completely bypasses the actuator device 16 so that the clutch 12 can be directly operated.

According to a further embodiment, the actuator device 16 comprises a further manual or pedal operating device 84, separate from said manual operating device 24, which intercepts the first delivery circuit 36 downstream of the diverter means 48, so as to be able to directly operate the braking device 8.

In this case, the manual operating device 84 completely bypasses the actuator device 16 so as to be able to directly operate the braking device 8.

The manual operating device 84 may be implemented by using an additional lever or a pedal or button control.

As can be appreciated from the description, the present invention allows overcoming the drawbacks of the prior art.

In fact, the present solution allows the braking system (typically the rear one) and the clutch system to be actuated with a single actuator device mounted on a half-handlebar of the motorcycle and provided with a single manual operating device.

In this way, risks are avoided for the user in the event of a fall, since the solution prevents the hand of the same from being trapped between the mechanisms of the actuator device, as would happen in the solutions of the prior art.

In addition, the solution allows the rear brake to be operated with the left hand by means of a lever of large or standard dimensions and, therefore, with greater sensitivity compared to known pedal solutions or even compared to known solutions of reduced length (operated with the thumb).

Furthermore, the solution of the present invention, by contemplating the use of a single actuator device for the brake and the clutch, allows the overall weight of the actuator device and therefore of the relative actuator system for the brake and the clutch to be reduced.

A man skilled in the art, in order to meet contingent and specific requirements, may make several modifications and variants to the actuator devices and systems for motorcycles described above, all of which fall within the scope of the invention as defined by the following claims.

The invention claimed is:

1. An actuator device of a braking device and a clutch, comprising:
   a pump provided with a manually operated device for pressurizing a fluid by a float,
   a first delivery circuit and a second delivery circuit fluidly connected to an outlet of said pump,
   the first delivery circuit being fluidly connected to a braking device,
   the second delivery circuit being fluidly connected to a clutch,
   wherein
   the actuator device comprises a diverter device suitable for fluidly connecting the output of the pump alternately with the first delivery circuit and with the second delivery circuit, so as to alternately actuate the braking device or the clutch,
       wherein said diverter device is operatively connected with a switch able to arrange the diverter device to set the fluid connection of the outlet of the pump with the first delivery circuit or with the second delivery circuit respectively.

2. The actuator device of a braking device and a clutch according to claim 1, wherein said actuator device comprises a control unit programmed to control the diverter device based on the signal received from said switch.

3. The actuator device of a braking device and a clutch according to claim 2, wherein said control unit is operatively connected to a pressure sensor arranged on the outlet of the pump.

4. The actuator device of a braking device and a clutch according to claim 2, wherein said control unit is operatively connected to at least one pressure sensor arranged on each of said first and second delivery circuits.

5. The actuator device of a braking device and a clutch according to claim 1, wherein the diverter device comprises a first shut-off valve and a second shut-off valve, and wherein the outlet of the pump forks into a first branch and a second branch, wherein the first branch is connected/disconnected to/from the first delivery circuit by the first shut-off valve, and wherein the second branch is connected/disconnected to/from the second delivery circuit by the second shut-off valve.

6. The actuator device of a braking device and a clutch according to claim 5, wherein said shut-off valves are two-way solenoid valves, switched so that when the first shut-off valve is open, the second shut-off valve is closed and vice versa.

7. The actuator device of a braking device and a clutch according to claim 6, wherein said shut-off valves are manually operable so that when the first shut-off valve is open, the second shut-off valve is closed and vice versa.

8. The actuator device of a braking device and a clutch according to claim 1, wherein the diverter device comprises a 3-way shut-off valve, arranged on the outlet of the pump and alternately connectable to the first supply circuit and the second supply circuit.

9. The actuator device of a braking device and a clutch according to claim 8, wherein said three-way shut-off valve is provided with pneumatic actuation.

10. The actuator device of a braking device and a clutch according to claim 8, wherein said three-way shut-off valve is provided with electric or electromagnetic or manual actuation.

11. The actuator device of a braking device and a clutch according to claim 1, wherein the actuator device comprises a further manual operating device, separate from said manual operating device, which intercepts the second delivery circuit downstream of the diverter device, so as to be able to directly actuate the clutch.

12. The actuator device of a braking device and a clutch according to claim 1, wherein the actuator device comprises a further manual operating device, separate from said manual operating device, which intercepts the first delivery circuit downstream of the diverter device, so as to be able to directly operate the braking device.

13. The actuator device of a braking device and a clutch according to claim 1, wherein the manual operating device is a lever device or a pedal device.

14. A hydraulic actuator system for a motorcycle comprising an actuator device of a braking device and a clutch according to claim 1, wherein the actuator hydraulic system comprises a braking device fluidly connected to the first delivery circuit and a clutch fluidly connected to the second delivery circuit.

15. An actuator device of a braking device and a clutch, comprising:
    a pump provided with a manually operated device for pressurizing a fluid by a float,
    a first delivery circuit and a second delivery circuit fluidly connected to an outlet of said pump,
    the first delivery circuit being fluidly connected to a braking device,
    the second delivery circuit being fluidly connected to a clutch,
        wherein the actuator device comprises a diverter device suitable for fluidly connecting the output of the pump alternately with the first delivery circuit and with the second delivery circuit, so as to alternately actuate the braking device or the clutch,
        wherein said actuator device comprises a control unit programmed to control the diverter device based on the signal received from said switch.

16. An actuator device of a braking device and a clutch, comprising:
    a pump provided with a manually operated device for pressurizing a fluid by a float,
    a first delivery circuit and a second delivery circuit fluidly connected to an outlet of said pump,
    the first delivery circuit being fluidly connected to a braking device,
    the second delivery circuit being fluidly connected to a clutch,
        wherein the actuator device comprises a diverter device suitable for fluidly connecting the output of the pump alternately with the first delivery circuit and with the second delivery circuit, so as to alternately actuate the braking device or the clutch,
        wherein the diverter device comprises a first shut-off valve and a second shut-off valve, and wherein the outlet of the pump forks into a first branch and a second branch, wherein the first branch is connected/disconnected to/from the first delivery circuit by the first shut-off valve, and wherein the second branch is connected/disconnected to/from the second delivery circuit by the second shut-off valve.

17. An actuator device of a braking device and a clutch, comprising:
    a pump provided with a manually operated device for pressurizing a fluid by a float,
    a first delivery circuit and a second delivery circuit fluidly connected to an outlet of said pump,
    the first delivery circuit being fluidly connected to a braking device,
    the second delivery circuit being fluidly connected to a clutch,
        wherein the actuator device comprises a diverter device suitable for fluidly connecting the output of the pump alternately with the first delivery circuit and with the second delivery circuit, so as to alternately actuate the braking device or the clutch,
        wherein the diverter device comprises a 3-way shut-off valve, arranged on the outlet of the pump and alternately connectable to the first supply circuit and the second supply circuit.

18. An actuator device of a braking device and a clutch, comprising:
    a pump provided with a manually operated device for pressurizing a fluid by a float,
    a first delivery circuit and a second delivery circuit fluidly connected to an outlet of said pump,
    the first delivery circuit being fluidly connected to a braking device,
    the second delivery circuit being fluidly connected to a clutch,
        wherein the actuator device comprises a diverter device suitable for fluidly connecting the output of the pump alternately with the first delivery circuit and with the second delivery circuit, so as to alternately actuate the braking device or the clutch,
        wherein the actuator device comprises a further manual operating device, separate from said manual operating device, which intercepts the second delivery circuit downstream of the diverter device, so as to be able to directly actuate the clutch.

19. An actuator device of a braking device and a clutch, comprising:
    a pump provided with a manually operated device for pressurizing a fluid by a float,
    a first delivery circuit and a second delivery circuit fluidly connected to an outlet of said pump,
    the first delivery circuit being fluidly connected to a braking device,
    the second delivery circuit being fluidly connected to a clutch,
        wherein the actuator device comprises a diverter device suitable for fluidly connecting the output of the pump alternately with the first delivery circuit and with the second delivery circuit, so as to alternately actuate the braking device or the clutch,
        wherein the actuator device comprises a further manual operating device, separate from said manual operating device, which intercepts the first delivery circuit downstream of the diverter device, so as to be able to directly operate the braking device.

* * * * *